US008060060B1

(12) United States Patent
Schempp et al.

(10) Patent No.: US 8,060,060 B1
(45) Date of Patent: Nov. 15, 2011

(54) SELECTIVELY LIMITING COMMUNICATIONS THROUGH A PORT OF A MOBILE COMMUNICATIONS DEVICE

(75) Inventors: Dale Scott Schempp, Lenexa, KS (US); Christopher Robert DeLaTorre, Lenexa, KS (US); Karl William Hammerberg, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 669 days.

(21) Appl. No.: 12/186,181

(22) Filed: Aug. 5, 2008

(51) Int. Cl.
*H04M 1/66* (2006.01)
*H04M 3/00* (2006.01)

(52) U.S. Cl. ........................ 455/411; 455/419

(58) Field of Classification Search .......... 455/410–411, 455/572–574, 432.1, 432.2, 412.1, 418–420, 455/557–558
See application file for complete search history.

(56) References Cited

U.S. PATENT DOCUMENTS

| | | | | |
|---|---|---|---|---|
| 6,195,546 | B1 * | 2/2001 | Leung et al. | 455/419 |
| 6,996,398 | B1 * | 2/2006 | Powell | 455/433 |
| 7,813,721 | B2 * | 10/2010 | Kim | 455/414.1 |
| 2004/0203598 | A1 * | 10/2004 | Aerrabotu et al. | 455/411 |
| 2006/0079224 | A1 * | 4/2006 | Welnick et al. | 455/432.1 |
| 2007/0117585 | A1 * | 5/2007 | Juneja et al. | 455/550.1 |
| 2008/0108321 | A1 * | 5/2008 | Taaghol et al. | 455/410 |
| 2009/0312046 | A1 * | 12/2009 | Clevenger et al. | 455/522 |

OTHER PUBLICATIONS

"HowardForums: Your Mobile Phone Community & Resource," www.howardforums.com/index.php, 4 pages.
"W370—Tracfone PC Connectivity?", www.cellphonehacks.com/viewtopic.php?p=192481, 9 pages.

* cited by examiner

*Primary Examiner* — Brandon Miller (57) ABSTRACT

Systems, products, and methods are disclosed for performing a method of selectively controlling communications through a communications port of a mobile communications device. The system-provider information is useable by the mobile communications device to communicate with a wireless telecommunications network that is designated in the system-provider information. Illustratively, the method includes presenting a user interface on the mobile communications device. The UI exposes an option to enable the communications port to be useable to modify the system-provider information. The mobile communications device can be in a first state that currently prohibits data from being passed through the communications port to the system-provider information. Input is received that is to be used to enable data to be passed through the communications port to the system-provider information. The input is authenticated to determine that it is a valid input that is authorized to transition the mobile communications device to a second state, in which the communications port is enabled to receive data that is useable to modify the system-provider information. Incident to authenticating the input, the mobile communications device is transitioned to the second state.

17 Claims, 10 Drawing Sheets

SELECTIVELY LIMITING COMMUNICATIONS THROUGH A PORT OF A MOBILE COMMUNICATIONS DEVICE

CROSS REFERENCE TO RELATED APPLICATIONS

This Application is related by subject matter to an application Ser. No. 12/186,219 entitled "RESTRICTING ACCESS TO SYSTEM-PROVIDER INFORMATION STORED IN A MOBILE COMMUNICATIONS DEVICE," and filed on even date herewith. Said related application is expressly incorporated by reference herein.

SUMMARY

Embodiments of the present invention are defined by the claims below. But in brief and at a high level, this disclosure describes a way for of selectively controlling features including data passed through a communications port of a mobile communications device such that the data throughput is allowable only in certain contexts. This situation is reversible, such that full communications can be enabled in otherwise all contexts. This disclosure also describes ways of protecting system-provider information that is stored within a mobile communications device so that only requests that are received from a wireless telecommunications network are usable to modify the system-provider information. In some embodiments, system-provider information includes a list of the systems and/or types of systems that a mobile communications device can communicate with, including such things as a list of service providers and frequencies to utilize.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDMA | Code Division Multiple Access |
| GSM | Global System for Mobile communications/ Groupe Spécial Mobile |
| JTAG | Joint Test Action Group |
| MVNO | Mobile Virtual Network Operator |
| OTA | Over the Air |
| OTW | Over the Wire |
| PRL | Preferred Roaming List |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
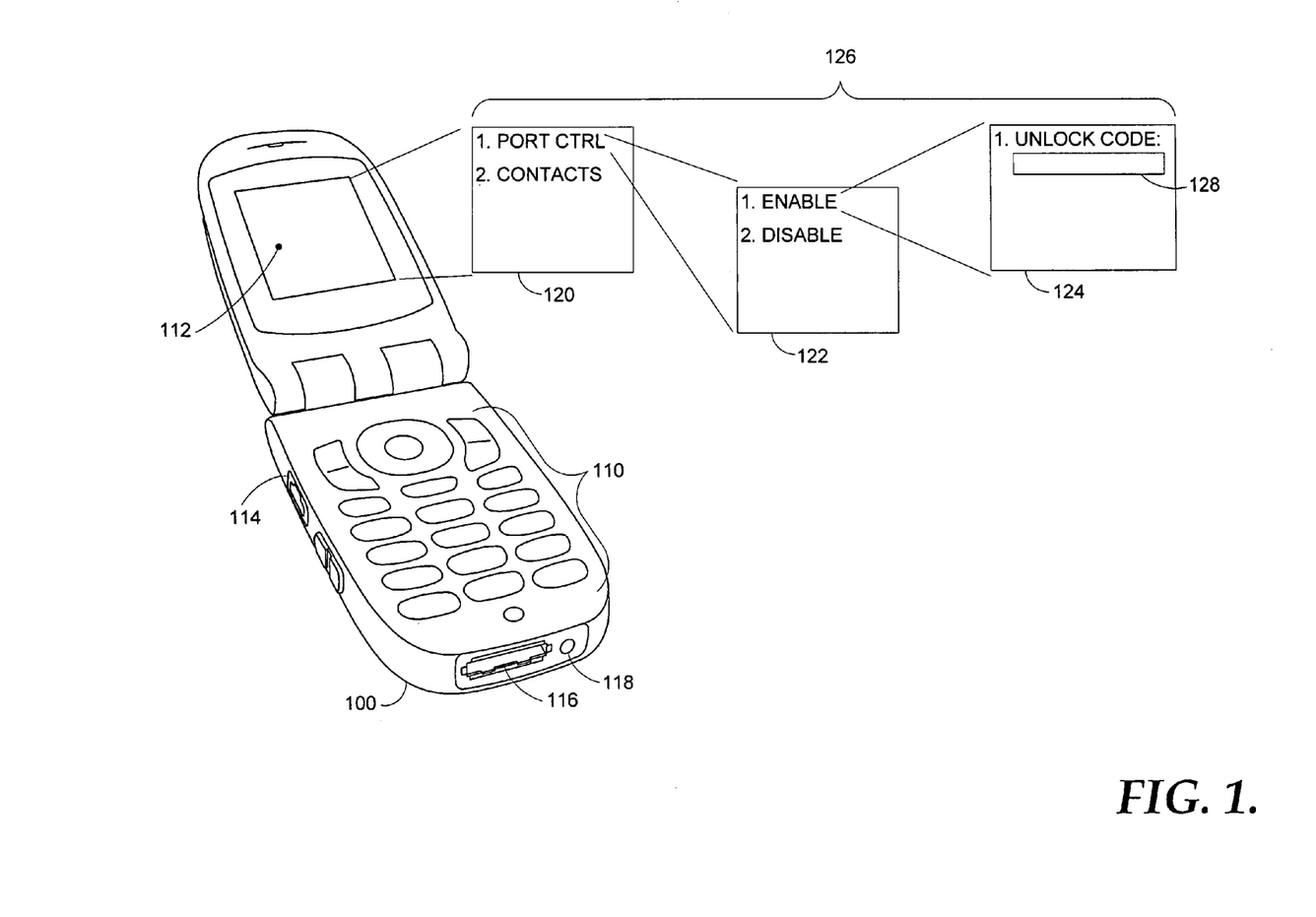
FIG. 1, depicts an illustrative mobile communications device and an illustrative user interface suitable for practicing an embodiment of the present invention.

Turning now to FIG. 1, an illustrative mobile communications device is provided and referenced generally by the numeral 100. Throughout this description, we might refer to a "mobile device" or even just "device," but may do so for brevity, or as a shorthand form. We do not mean to imply a distinction with the different terms. Mobile communications device 100 includes a keypad 110 as well as a display 112, which is suitable for presenting a user interface. Device 100 also includes one or more communications ports. For example, a first communications port 114 as well as a second communications port 116. In some embodiments, only a single communications port is provided on mobile device 100. Sometimes, a communications port doubles as a charging port such that the communications port is also usable to recharge a power source of device 100.

In other embodiments, a separate power port, e.g. 118, is provided to enable recharging of mobile communications device 100. In still other embodiments, other communications ports are present on or within mobile communications device 100, but are not shown so as to not obscure the present invention. For example, a JTAG port is provided on some phones. The JTAG port is often located on the reverse of the phone underneath a battery of the phone and is sometimes usable to program the phone at the factory stage. That is, the JTAG port is sometimes used to originally program mobile communications device 100.

As briefly mentioned, display 112 can present a user interface, which in some embodiments includes multiple screens to expose various functional aspects of embodiments of the present invention. We show three illustrative screens, and label them with reference numerals 120, 122, and 124. We will discuss these illustrative screens of a user interface after describing certain components of mobile communications device 100 in greater detail.

Figure 2:
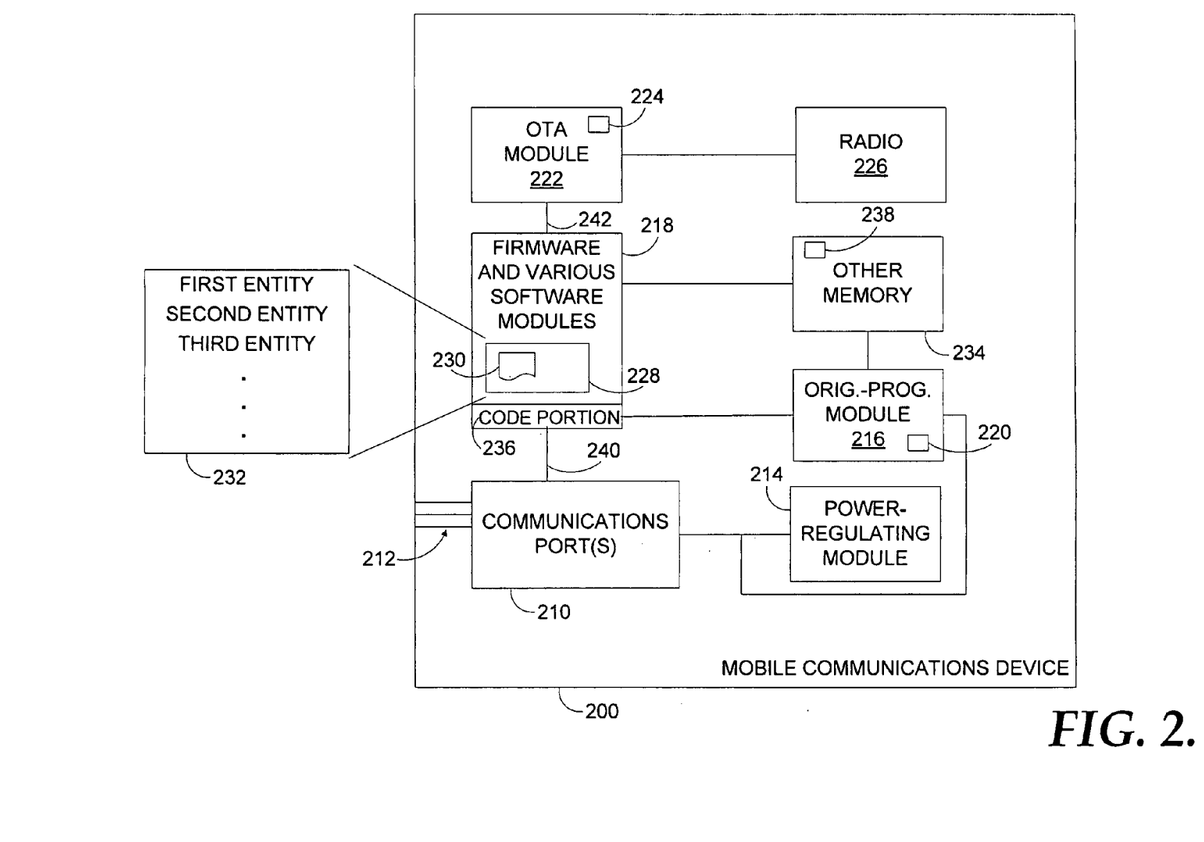
FIG. 2, depicts an illustrative schematic representation of the mobile communications device of FIG. 1 according to an embodiment of the present invention.

Turning now to FIG. 2, an illustrative schematic representation of mobile communications device 100 is provided and referenced generally by the numeral 200. So as to help make clear what portions of the figures we are referring to, we will refer to the mobile communications device of FIG. 2 in connection with numeral 200 even though it is a schematic representation of what we previously refer to as mobile communications device 100. Each is interchangeable.

Mobile communications device 200 includes a set of one or more communications ports 210, each of which might include a set of leads 212. Because readability can sometimes be frustrated by trying to refer to too many items in the plural, we will begin and continue referring to certain items in the singular. Although we refer to certain items in the singular, we by no means mean to imply that there is only one such item. For example, we might refer to a radio of the mobile communications device, but do not mean to imply that it has only a single radio. To the contrary, the mobile device might have multiple radios to facilitate, among other things, communications with various types of networks such as CDMA, WiMAX, and GSM to name a few.

Communications port 210 is coupled to a power-regulating module 214. Power-regulating module 214 is coupled to a power source (not shown), and regulates power to, and sometimes from, a battery of the mobile device. As we will explain in greater detail below, one of the aspects of an embodiment of the present invention is to selectively control communications through communications port 210 (which might include ports 114, 116, a JTAG port, or other). But in order to selectively enable features, an embodiment of the invention contemplates not severing all contact with all devices external to mobile communications device 200. Embodiments of our invention contemplate being able to reenable communications through communications port 210 as well as being able to simultaneously disable communications through port 210 while allowing selective features such as a recharging of the devices battery. Thus, leads 212 might enable communications port 210 to receive a flow of electricity that is received by power-regulating module 214, which directs the flow to the device's battery.

In some embodiments, communications port 210 is coupled to what we refer to as an original-programming module 216 (variously referred to herein as an "over-the-wire" module). This module, as with many other modules described herein, might be known by different names to those of ordinary skill in the art. For example, some might know original-programming module 216 by the terms "factory-programming module," or "over-the-wire (OTW) module." Regardless, the functionality offered by original-programming module 216 is to help facilitate an original-programming of mobile communications device 200. That is, in a factory-type setting, original instructions might be provided to firmware and various other software modules, which I reference by numeral 218. Original-programming module 216 can be associated with an identifier 220 such that identifier 220 is usable to identify a source of data as coming from original-programming module 216. This identifier is usable to identify any communications that might be attempting to be passed through communications port 210.

In contrast to over-the-wire module 216, an over-the-air (OTA) module 222 receives data over the air; that is, by way of a wireless telecommunications network. In some embodiments, it is associated with an identifier 224. When we refer to a wireless telecommunications network, we are referring to a network capable of communicating data in a wireless-telecommunications context. Thus, networks such as Wi-Fi networks or small short-range networks such as Bluetooth networks are distinguished from wireless telecommunications networks. Although those networks might form a portion of a wireless telecommunications network, they are not synonymous with a wireless telecommunications network.

OTA module 222 receives data that is wirelessly communicated from a telecommunications network. In one embodiment, the data is received by way of a radio 226, which sends and receives wireless signals to and from a wireless telecommunications network. Radio 226 might, for example, communicate data in formats such as CDMA, GSM, or WiMAX.

We briefly mentioned firmware and other various software modules, which is being generally referred to by numeral 218. Numeral 218 indicates various types of software modules or other firmware that might be present in mobile communications device 200. Illustrative software includes things such as the operating system of a phone, third-party applications such as games, programs to watch television on the device, ring tones, location-based services, contact information, and the like. In some embodiments, system-provider information 228 is included as part of software 218.

System-provider information 228 is information that describes what type of systems that mobile communications device 200 can interact with. For example, system-provider information 228 might describe which bands, sub bands, service-provider identifiers, and the like will be scanned and in what priority order. An acquisition table might form part of system-provider information 228. An acquisition table includes a list of frequencies on which the device might search for particular systems. A system table might also be included. A system table might take the form of a prioritized list of systems that the device is permitted to access. It might also include a list of systems that the device is explicitly prohibited from accessing (negative systems). In some embodiments, some or all of this information takes the form of a preferred roaming list (PRL) 230. This is another example where ordinary skilled artisans might use different names to refer to different items.

That is, some might consider certain information being a part of PRL 230, whereas others might not refer to a PRL per se. Regardless, system-provider information 228 is meant to include the type of information that mobile device 200 utilizes in connection with establishing a communications ability with a wireless telecommunications network. As mobile device 200 initializes, or periodically at other times, it attempts to establish a link with a wireless telecommunications network. In order to do that, certain information is utilized, such as which types of networks it can interact with, which frequencies it might communicate data upon, and which carriers or entities might it communicate with to the extent such information is not subsumed within the information indicating which types of networks it might communicate with. By way of example, a list of entities is provided and referenced by the numeral 232. This 232 shows a first entity, a second entity, a third entity, and indicates by way of the ellipses that other entities might be included.

These entities might take the form of wireless telecommunications services providers (providers). Illustrative providers include entities such as Sprint Nextel, AT&T, Cricket, Virgin Mobile, Verizon, SK Telecom, Kajeet Wireless, and the like. Some providers own and operate networks of their own, while other providers are authorized vendors or resellers, sometimes known as mobile virtual network operators (MVNOs). Other memory of mobile communications device 200 is represented by numeral 234.

We do not mean FIG. 2 to indicate all, or even major, systems or components of mobile communications device 100. Similarly, the connections shown are not meant to indicate that other connections are not present or that the connections are direct connections. We provide an overview of mobile communications device 100 and list certain components so as to be able to refer to them throughout this disclosure.

As previously mentioned, one embodiment of the invention takes the form of performing a method of selectively controlling communications through a communications port of a mobile communications device. We describe methods for limiting an ability of data to flow through a communications port of a mobile communications device. In some cases, this limitation is absolute, and in other situations this limitation is limited to restricting the flow of data to certain components within the mobile communications device, such as system-provider information 228. In many respects, this is not intuitive because manufacturers offer as selling points and features an ability to communicate with a mobile communications device by way of a communications port.

But here, we describe ways in which information flow into a mobile communications device can be limited if that information is being communicated by way of a hard wire communications port. However, nearly disabling a communications port can be undesirable without an ability to reenable the port, especially being able to reenable an ability to communicate data through the port into the mobile communications device. Thus, embodiments of our invention contemplate an ability to reenable communications through the communications port. Still again, in other embodiments, we describe methods for limiting data input to data that is received over the air. We will describe these various embodiments below.

Figure 3:
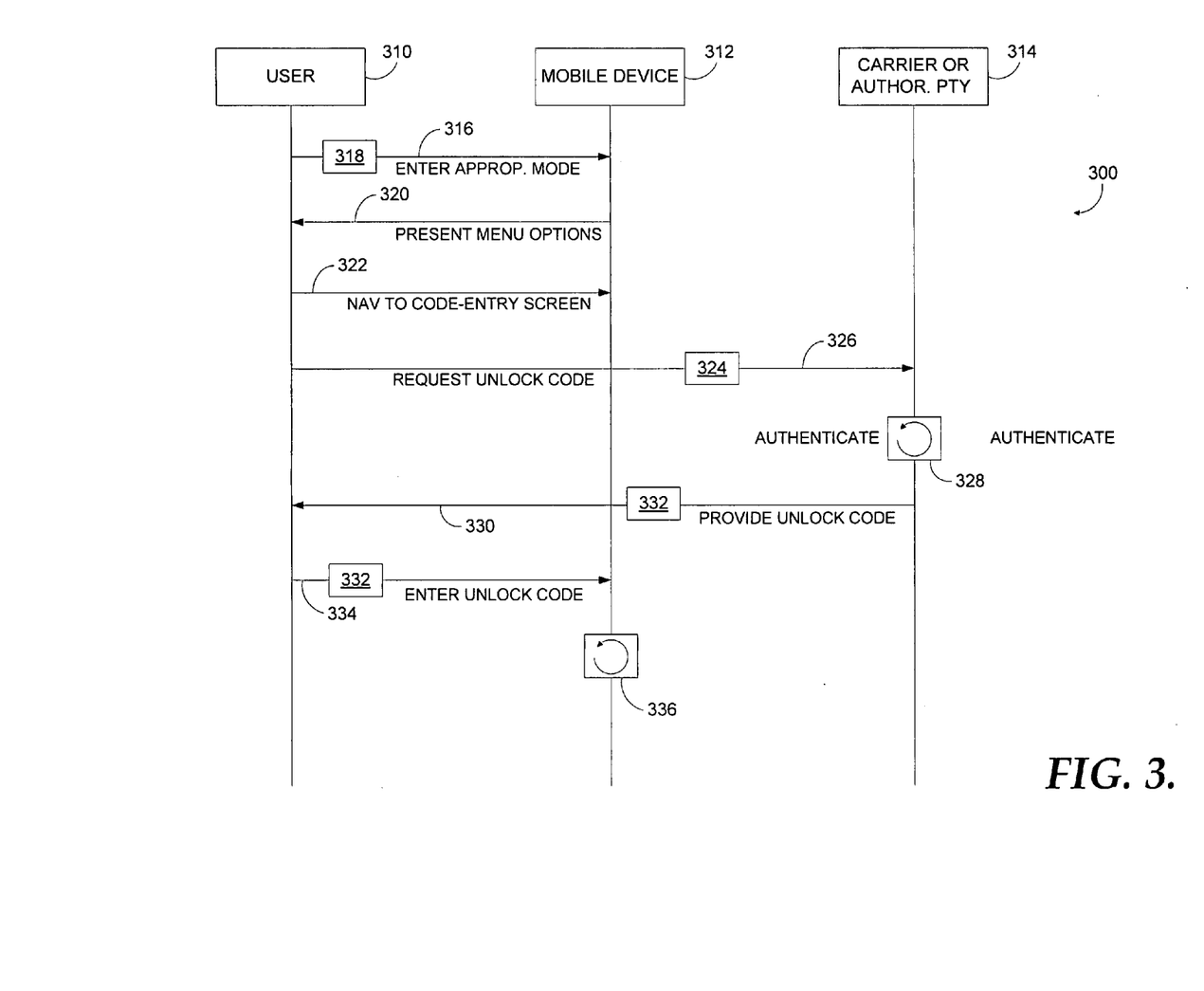
FIG. 3, depicts an illustrative data-flow diagram according to an embodiment of the present invention.

Turning now to FIG. 3, an illustrative method for controlling communications through a communications port according to an embodiment of the invention is provided and referenced generally by the numeral 300. In this illustrative example, we will make reference to a user 310, a mobile device 312, and a carrier or other authorized party 314. When we speak of a "carrier," we speak of a telecommunications carrier, which may take the form of being named items in entity list 232. Of course not all of the steps recited in FIG. 3 nor any of the flowcharts herein are necessarily required, and these steps do not indicate a dispositive order. At a step 316, an appropriate mode is entered into. One way of entering into a mode that would allow configuration of communications port 210 is by entering a key sequence 318. An illustrative key sequence may take the form of ##data#.

That is, a user might utilize keyboard 110 to enter a string such as "##1234#" to enter into a configuration mode. At a step 320, mobile communications device 312 presents menu options on its display. Turning briefly to FIG. 1, portions of an illustrative user interface 126 are provided. The user interface 126 may include the illustrative screen shown, a portion thereof, or additional screens. By way of tying the example of FIG. 3 to FIG. 2, at a step 320 perhaps screen 120 is presented on display device 112. At a step 322, mobile device 312 receives input to navigate to a co-entry screen. Thus, mobile device 312 might first present screen 120, which exposes options for a user to modify or control a port of device 100. Device 100 might receive input indicating a desire to control the port, leading to a screen such as 122, which presents options to enable or disable the port. If the port is to be enabled, then screen 124 might be transitioned to, which seeks an unlock code (variously referred to herein as "access code" or just "code") by way of box 128 in one embodiment.

Returning to FIG. 3, a request 324 for an unlock code happens at a step 326. In some embodiments, this request is made by user 310. In other embodiments, this request is made by carrier or other authorized party 314. That is, in some embodiments the invention contemplates a user being able to unlock port 210, and in other embodiments, such request might only be allowed to be made from an authorized party such as an MVNO or other reseller.

An authentication step 328 occurs as shown. In some embodiments, the step of authentication 328 is accomplished by authenticating that mobile device 312 is authorized to connect to a certain telecommunications network. For example, if a certain carrier subsidized the cost of mobile device 100 and thus intended mobile device 100 to be used on its network or a reseller of features that are offered by way of the network. Thus, authentication step 328 may take on a variety of forms. In a first way, authentication 328 includes mobile device 200 successfully communicating with a wireless telecommunications network that it is designated to communicate with. This might include a mobile device attempting to and successfully establishing a communications link with a wireless telecommunications network.

By way of further illustration, authentication step 328 might take the form of machine-to-machine customer service. That is, a user might log into a website affiliated with a wireless telecommunications network provider of interest and provide credentials associated with the mobile communications device in order to receive an unlock code. For example, the website might receive indicia that identifies the mobile device of interest. In one embodiment, a phone number might be provided, but other forms of indicia that might serve to identify the mobile communications device includes a mobile subscriber identifier (MSID), electronic serial number (ESN), or any other identifier that uniquely identifies the mobile communications device. With this information, the website can interact with a database to determine whether the particular device is authorized to communicate with the wireless telecommunications network and/or to determine whether it is authorized to have its communications port enabled to pass data into the device.

Figure 4:
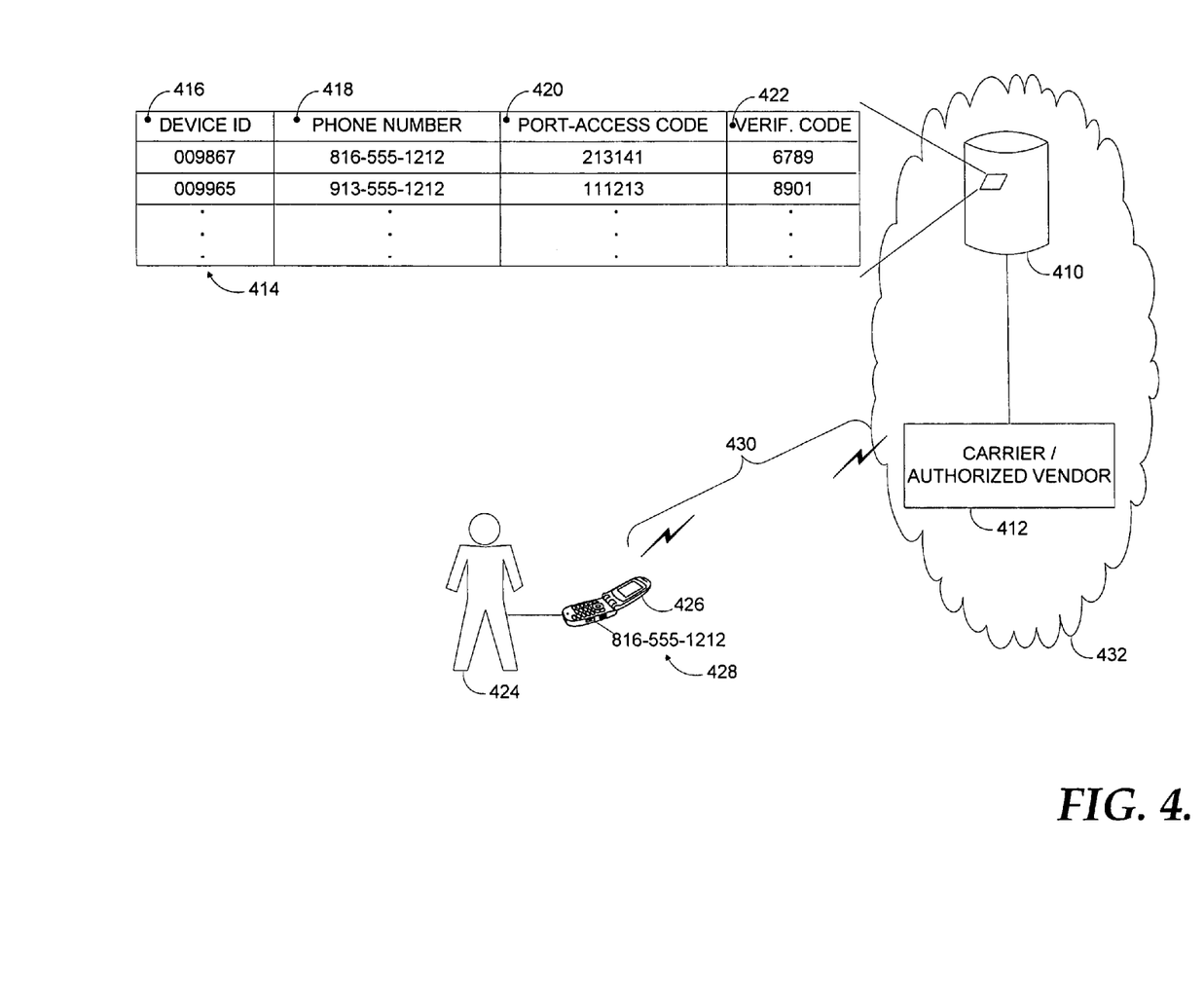
FIG. 4, depicts an illustrative operating environment of a mobile device and a wireless telecommunications network according to an embodiment of the present invention.

Turning briefly to FIG. 4, an illustrative database 410 is shown as being coupled to a carrier or other authorized vendor 412. In one embodiment database 410 includes a table or similar 414 that includes columns that have headings including device ID 416, phone number 418, port-access code (variously referred to herein as an unlock code, or just "code") 420, and verification code 422. Of course the columns shown are not the only columns that might be included in table 414, nor are the columns shown required. A user 424 is associated with mobile device 426 having a phone number 428 that is "816-555-1212." A communications link 430 is shown between mobile communications device 426 and wireless telecommunications network 432.

As we have previously mentioned, one form of authentication might include a carrier 412 (or, if desired, user 424) referencing a database such as database 410 to obtain port-access code 420. By way of illustration, a website might present a user interface front end(?) such that the website or other mechanism is able to receive identifying information such as the device ID 416, phone number 418, or other. Intimate to receiving this information, a port access code associated with the specific device identifier can be provided. However, to prevent unauthorized access to port-access-code information, in some embodiments, only a carrier or authorized vendor 412 is authorized to access the data stored in database 410. In other embodiments, mobile device 426 might be able to receive port-access code 420 by way of wireless telecommunications link 430 if a carrier decides to allow such mode of communication. For example, perhaps a carrier might allow its mode of communication after user 424 has been a subscriber of its services for some given duration of time, such as after it has recouped any subsidies that might have been provided in connection with making mobile device 426 available.

Returning to FIG. 3, at a step 330, an unlock code 332 is provided to the mobile device, and in some embodiments presented to user 310 by way of a user interface. In some embodiments, the unlock code is not presented to a user, but received at mobile device 312, which processes the unlock code 332 without the user ever seeing it. In other embodiments, a user 310 might employ a customer-service option (such as by way of a website) that provides unlock code 332. For example, an authorized reseller might receive mobile device 312, log into a website to retrieve unlock code 332, provide a mobile device's identifying indicia, and be presented by way of the website with unlock code 332, which it enters into the device at a step 334.

Thus, a variety of ways exist in which mobile device 312 receives unlock code 332. In some cases, unlock code 332 might be a few alphanumeric characters that can be entered into mobile device 312 by way of its keypad. In other embodiments, unlock code 332 might be a very long string of characters that were securely communicated to mobile device 312. Other variations of unlock code 332 are also available and would be apparent to one of ordinary skill in the art upon reading this disclosure.

At a step 336, if the unlock code is validated, and communications via the communications port is enabled. Returning to FIG. 2, in some embodiments, code portion 236 operates to prevent communications port 210 from passing data into software modules 218. That is, when data is attempted to be passed by way of communications port 210 into software modules 218, which might include system-provider information 228, this is not allowed until communications port 210 is authorized.

At step 336, the unlock code that was received at the mobile communications device is valid, then code portion 236 will allow communications port 210 to pass data into the mobile device. In some embodiments, layers of security are associated with accessing deeper levels of software within the mobile device. For example, still more authorization might be required to edit system-provider information 228, which in some embodiments includes preferred roaming list 230. Thus, perhaps a verification code 422 might also be necessary in order to modify system-provider information 228. In some embodiments, verification code 422 was provided at an initial programming stage of mobile device 200. It might, for example, take the form of a random number that was generated and stored in memory component 234. We designate by reference numeral 238 a verification code that might be stored in memory 234 in some embodiments.

Verification code 238 might be one of the values that comes from the verification code column 422 in FIG. 4. In the embodiment that additional security provisions are implemented to access system-provider information 228, a user might be required to enter verification code 238. In other embodiments, the value of verification code 238 might need to be received by some other means, perhaps also over the air, to enable communications port 210 to communicate data into mobile communications device 200.

Figure 5:
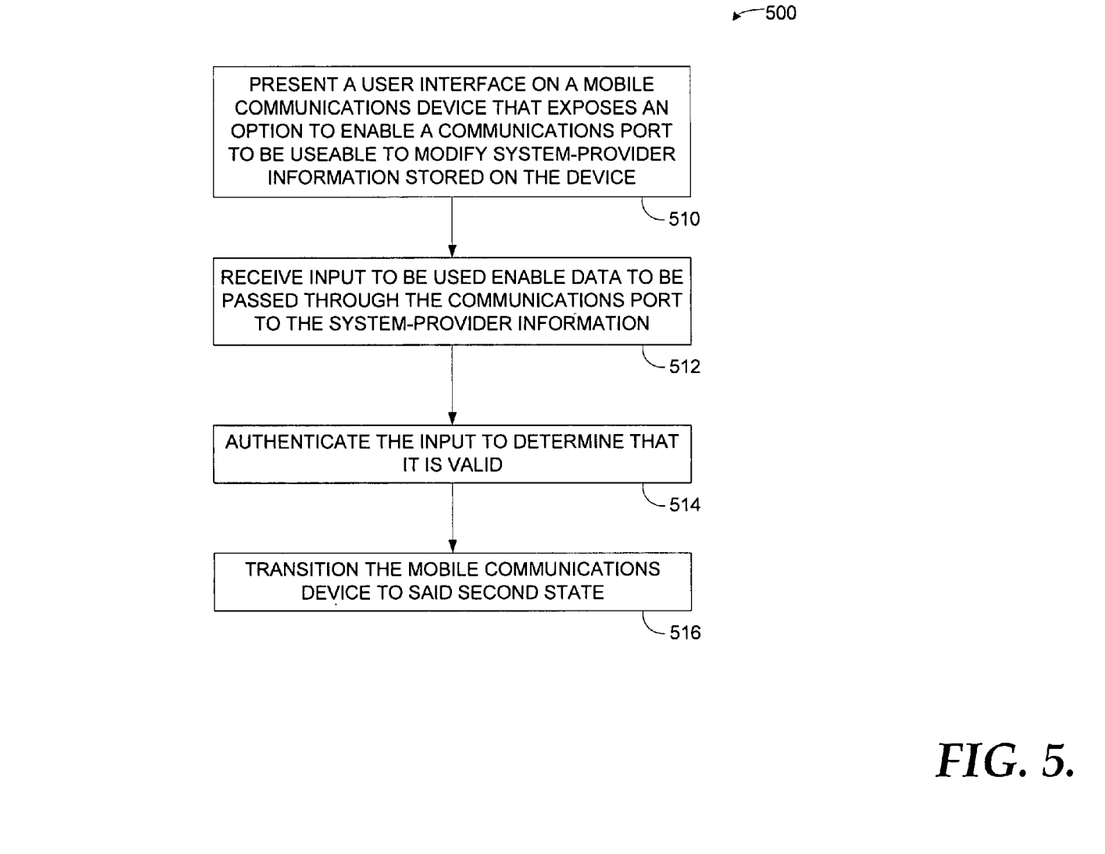
FIGS. 5-7, depict illustrative methods for selectively controlling communications through a communications port of a mobile communications device according to embodiments of the present invention.

Turning now to FIG. 5, an illustrative method of controlling communications through a communications port of a mobile communications device is provided and referenced generally by the numeral 500. At a step 510, a user interface is presented on a mobile communications device such as that of FIG. 1. The user interface exposes an option to enable a communications port such as ports 114, 116, or other ports not shown such as the JTAG port to be usable to modify system-provider information 228. In some embodiments, the mobile communications device is in a first state that currently prohibits data from being passed through the communications port to the system-provider information.

We have previously described that one way of limiting such access is to implement a code portion such as code portion 236 that monitors a delivery ability of communications port 210 such that if communications port 210 is not allowed to pass data to the mobile communications device, then code portion 236 prohibits it. Although we show code portion 236 as what might appear to be a portion of software modules 218, it might be the case that the individual software modules each employ a check to determine where data is coming from or originated. For example, if data is being received by way of communications port 210, then that data is not allowed to pass. In other embodiments, an entire communications pathway might be disabled until the functionality of communications port 210 is enabled. Thus, in such an embodiment, a pathway such as pathway 240 is not enabled until communications port 210 is authorized to receive and pass data into the mobile communications device.

Returning to FIG. 5, at a step 512, input is received that is to be used to enable data to be passed through the communications port to the system-provider information 228. We have mentioned that this input might be received by way of keypad 110 but might also be received in various other ways, such as over the air.

At a step 514, the input received is authenticated to determine that it is valid. We have mentioned that the input that is received might take the form of a few alphanumeric characters, or might be a very long bit stream that is received and authenticated over the air. The input, if valid, is usable to authorize transitioning the mobile communications device to a second state in which the communications port is enabled to receive data that is usable to modify system-provider information 228. Thus, if the input received is valid, then the mobile communications device will transition from the first state into the second state whereby data will be allowed to be received through communications port 210, which transition we refer to by reference numeral 516.

As mentioned, the system-provider information might include a list of frequencies on which the mobile communications device is to search and possibly an order in which the frequencies are to be searched also. The system-provider information might also include a list of systems that the device is permitted to access. Different systems might be owned by different carriers, which are also sometimes known as providers. The list of systems might also list different wireless telecommunications networks or types of networks. We have also mentioned that selective features can be retained that are associated with communications port 210.

For example, communications port 210 might be usable to recharge a battery of the mobile communications device 200. Thus, merely physically removing pins or leads 212, shocking communications port 210, and/or otherwise physically or in some other way permanently damaging communications port 210 would not allow for such selective features. Our invention is not merely disabling a communications port on a mobile communications device. Rather, it contemplates ways in which selective features associated with the communications port can still be retained and, moreover, contemplates a way of reenabling full functionality associated with the communications port so as to preserve a value of the mobile communications device during its life cycle.

Mobile communications devices have a life cycle that includes an initial phase but also a subsequent phase. For example, many programs exist to make additional use of older phones or phones that no longer serve as primary phones. For example, a program exists wherein persons offering military service are able to receive preowned phones. If those preowned phones had their communications ports permanently disabled, then such phones would be of limited use in this latter life cycle. But our invention contemplates an ability to, if desired, reenable a previously disabled communications port so that if full functionality is desired to be reprovided to the mobile communications device, then it can be done.

Another selective feature might include permitting the communications port to be used to retrieve data from the mobile communications device, but preventing data from being communicated to the mobile communications device. Thus, in this embodiment, data might be allowed to flow out of the mobile communications device, but not into it.

Figure 6:
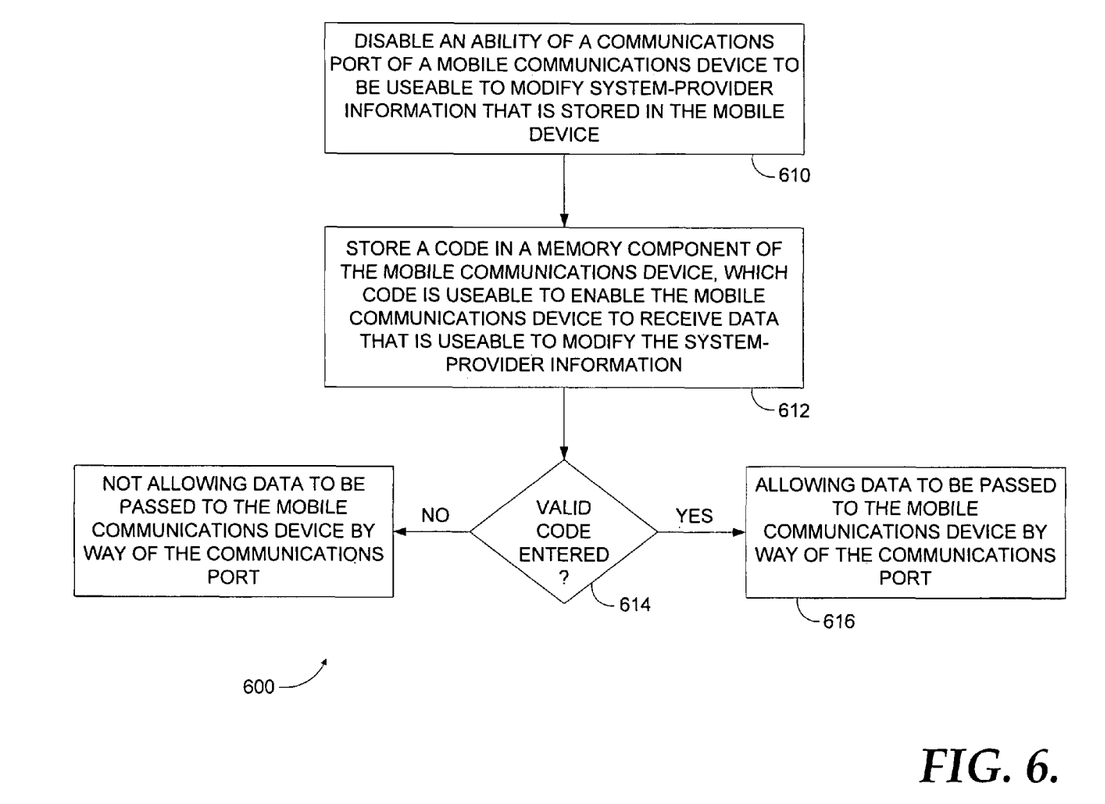

Turning now to FIG. 6, another illustrative method for controlling communications through the communications port of a mobile communications device is provided and referenced generally by the numeral 600. At a step 610 an ability is disabled of a communications port of a mobile communications device to be usable to modify system-provider information that is stored in the mobile device. Thus, whereas the mobile device might have once had an ability to communicate data through its communications port, this functionality is disabled in step 610.

At a step 612, a code is stored in a memory component of the mobile communications device. This code is usable to enable the mobile communications device to receive data which is usable to modify the system-provider information. By way of illustration, it might be the case that as the mobile device was being programmed at the factory, an access code (such as 420) was stored in a memory component such as 234. Thus, mobile device 200 has stored within it an unlock code that is usable to serve as a benchmark to validate an unlock code that is entered at some other time.

At a step 614, a determination is made as to whether the code that was entered was a valid code. In some embodiments, this validation process can be accomplished independently by the mobile communications device. This would be possible because the mobile communications device would have stored within it the value of the access code. Thus, upon receiving the code it can validate whether that code is valid or not. If the code is valid, then processing would advance to a step 616 wherein data would be allowed to be passed to the mobile communications device by way of the communications port. But if the code that was entered is not valid, then data would not be allowed to be passed to the mobile communications device by way of the communications port.

Figure 7:
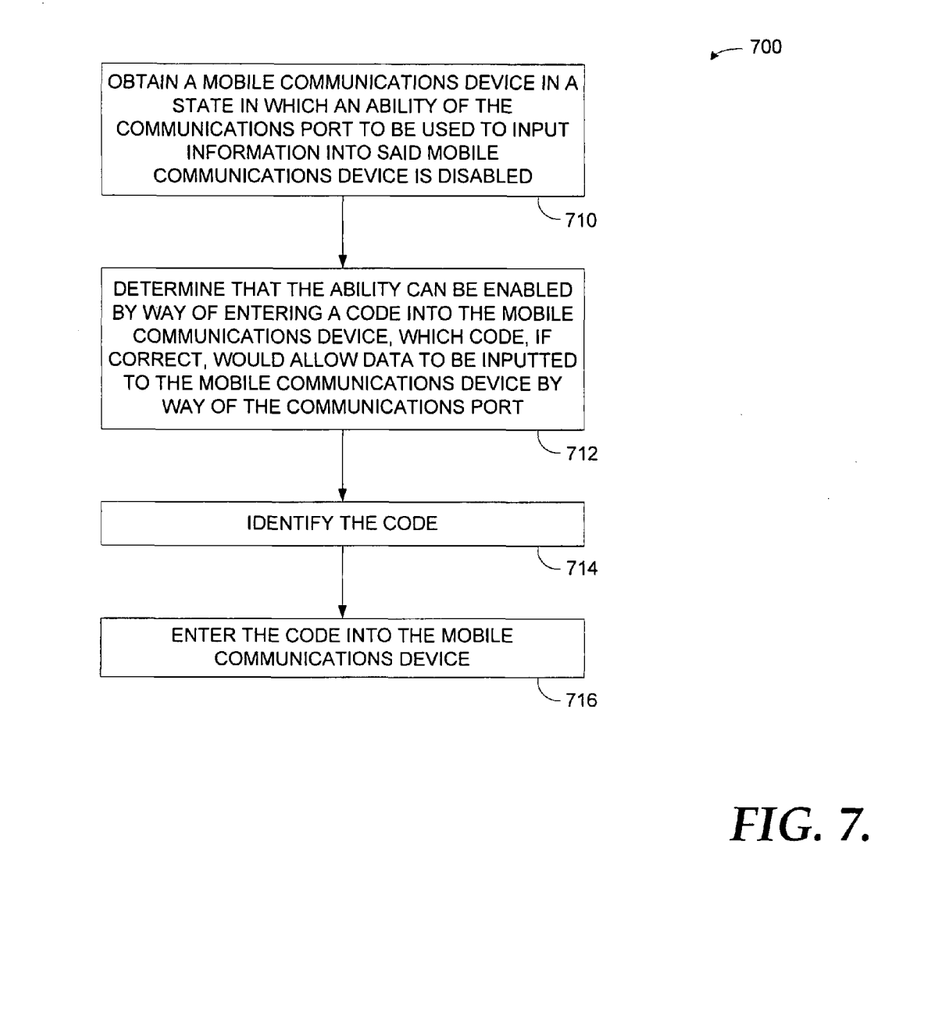

Turning now to FIG. 7, still another illustrative method for controlling communications through a communications port of a mobile communications device is provided and referenced generally by the numeral 700. At a step 710, a mobile communications device is received or obtained in a state in which an ability of the communications port to be used to input information into the mobile communications device is disabled. Thus, an entity might receive a mobile communications device that includes a communications port, but that communications port is not usable to communicate information into the mobile communications device. At a step 712, a determination is made that the ability can be enabled by way of entering a code into the mobile communications device. Thus the entity receiving or obtaining the phone determines that the communications port might be usable to communicate data, it is just currently not in a state to do so. The code, if correct, would allow data to be inputted into the mobile communications device by way of the communications port.

At a step 714, the code is identified. Thus, the correct code that would enable communications to be made through the communications port is determined. At step 716, the identified code is entered into the mobile communications device, thereby enabling the communications port to be used to input data into the device.

In still other scenarios, an entity might wish to further restrict access to software within the mobile communications device. In such a scenario, an entity may wish to limit data that can be received into the mobile device to be received over the air. That is, only data received wirelessly, or what is termed "over the air," is useable to modify data within mobile communications device 200. In this way, access to device software can be blocked unless it stemmed from an over-the-air communication. In this scenario, the mobile communications device must be active on a given wireless telecommunications network. And to the extent the mobile communications device is associated with a user, that user must have an active account on the wireless communications network in order to receive any form of software upgrades, modifications to system-provider information 228, etc. Communications port 210 is not allowed to ever be used to modify system-provider information 228. Although the communications port 210 might be enabled or disabled, it is not allowed to be used to modify the system-provider information 228, which might include PRL 230. Thus, the only way PRL 230 or system-provider information 228 can be modified is by way of data received over-the-air, such as by way of wireless communication link 230.

In this environment, communications port 210 cannot be used to hack into mobile communications device 200 so as to modify system-provider information 228. The system-provider information 228 information will only recognize over-the-air requests. Thus, only requests that are received over-the-air are requests that will be passed on to see if they might be allowed to modify system-provider information 228. An illustrative way of effecting this functionality beyond what has been described includes writing system-provider information 228 as a 1-time right, or a flask, at an initial-programming stage. Then, the only way to modify the information would be by way of over-the-air requests. For example, a code can be written that essentially breaks itself. That is, 1-time code could be included such that once a value is written into a specific module, it cannot be modified except by way of a certain path, or receiving data from a certain origin.

With reference to FIG. 2, any over-the-wire module, including original-programming module 216, would no longer be usable to modify system-provider information 228. One way of accomplishing this, building on what we have mentioned above, would be to implement a code portion 236 that persistently blocks any data attempting to be passed into the device by way of communications port 210. Similarly, any software module within mobile communications device 200 could inspect a source of a modification command to determine whether that modification command should be granted. In some embodiments, inspecting a source of a command includes validating an identifier that identifies a module source.

For example the over-the-air module 222 includes an identifier 224. Any data received over-the-air might pass through this OTA module 222 as it is passed on to other software modules. The data received can be tagged or otherwise indicated as being received by way of OTA module 222, which includes identifier 224. Thus, any potential software that is to be modified, can request or otherwise inquire as to a source of the modification request. Incident to this request, identifier 224 is used as a benchmark to determine whether to validate any such request.

Another way of implementing an embodiment of the invention in which only OTA requests modify information are recognized would include only allowing certain communications pathways to pass information into software module 218, or particularly system-provider information 228. Thus, in such an embodiment, perhaps a pathway such as pathway 242 is allowed, but pathway 240 is not.

Figure 8:
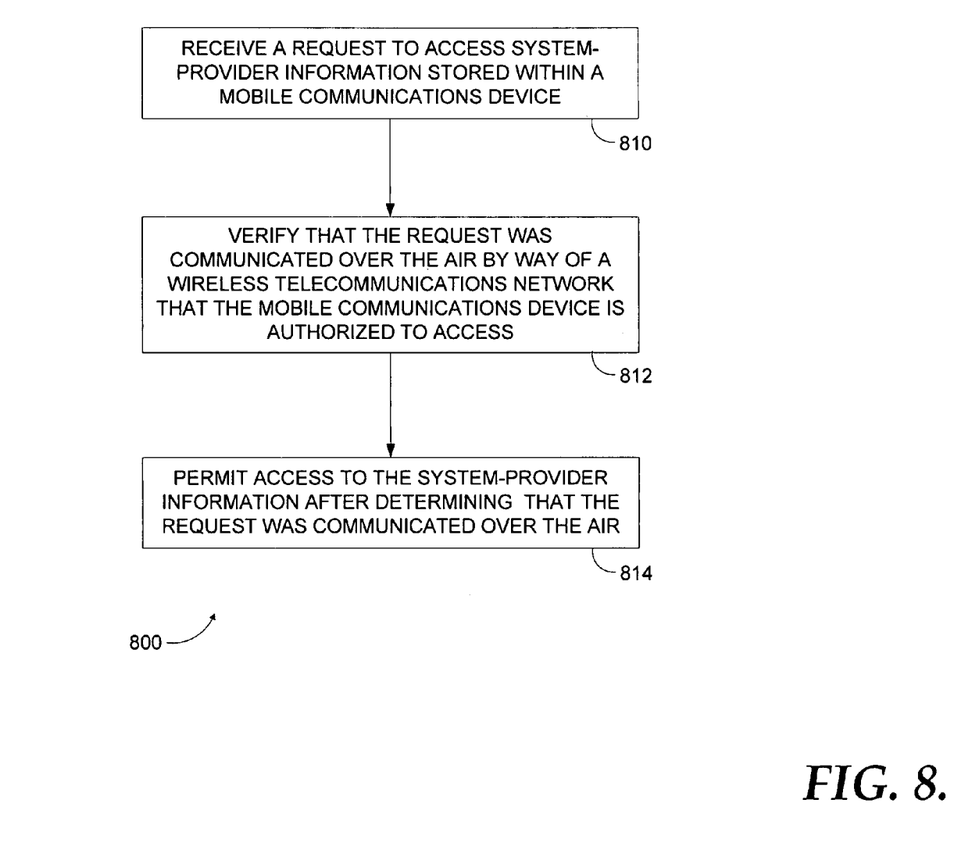
FIGS. 8-10, depict illustrative methods for protecting system-provider information stored within a mobile communications device according to an embodiment of the present invention.

Turning now to FIG. 8, an illustrative method of limiting access to certain software components stored within mobile communications device 200 is provided and referenced generally by the numeral 800. At a step 810, a request is received to access system-provider information that is stored within mobile communications device 200.

At a step 812, verification is made as to whether the request was communicated over-the-air by way of a wireless telecommunications network that the mobile communications device is authorized to access. As mentioned, one way of verifying includes inspecting a first code to determine whether the request was received by way of an OTA module such as module 222 within the mobile communications device. This first code might be associated with the OTA module, which might have a variety of names but refers to any set of embodied software that receives information communicated over-the-air.

Additional layers of security can be included. For example, a verification code, such as that of column 422, could be provided and stored within other memory component 234. In this way, a value might have been stored at an original-programming stage such that a manufacturer of mobile communications device 200 knows of the code, but no one else unless the manufacturer lets another entity know. Another entity that might be allowed to know the code would be a wireless telecommunications services provider, which can include or is otherwise referred to as a "carrier." Thus, if someone found a way to communicate information in a spoofed type context to the device wirelessly, the user might be prompted in some embodiments to enter the verification code.

In some embodiments, the only way to obtain this verification code is to contact the relevant carrier. In some embodiments, the verification code is not even stored in any memory component of mobile communications device 200, but is only stored in database 410. In such an embodiment, a user might obtain the verification code, input the verification code into the mobile device, which would then communicate via wireless link 430 to have the entered code benchmarked against the value in database 410. However, if this additional layer of security is not desired nor implemented, then any sort of verification code is simply not used.

At a step 814, access is permitted to the system-provider information 228, etc. Communications port 210 is not allowed to ever be used to modify system-provider information 228. Although the communications port 210 might be enabled or disabled, it is not allowed to be used to modify system-provider information 228, which might include PRL 230. Thus, the only way PRL 230 or system-provider information 228 can be modified is by way of data received over the air, such as by way of wireless communications link 430.

Another way of implementing an embodiment of the invention in which only OTA requests modify information are recognized would include only allowing certain communications pathways to pass information into software module 218, or particularly system-provider information 228. Thus, in such an embodiment, perhaps a pathway such as pathway 242 is allowed, but pathway 240 is not.

Figure 9:
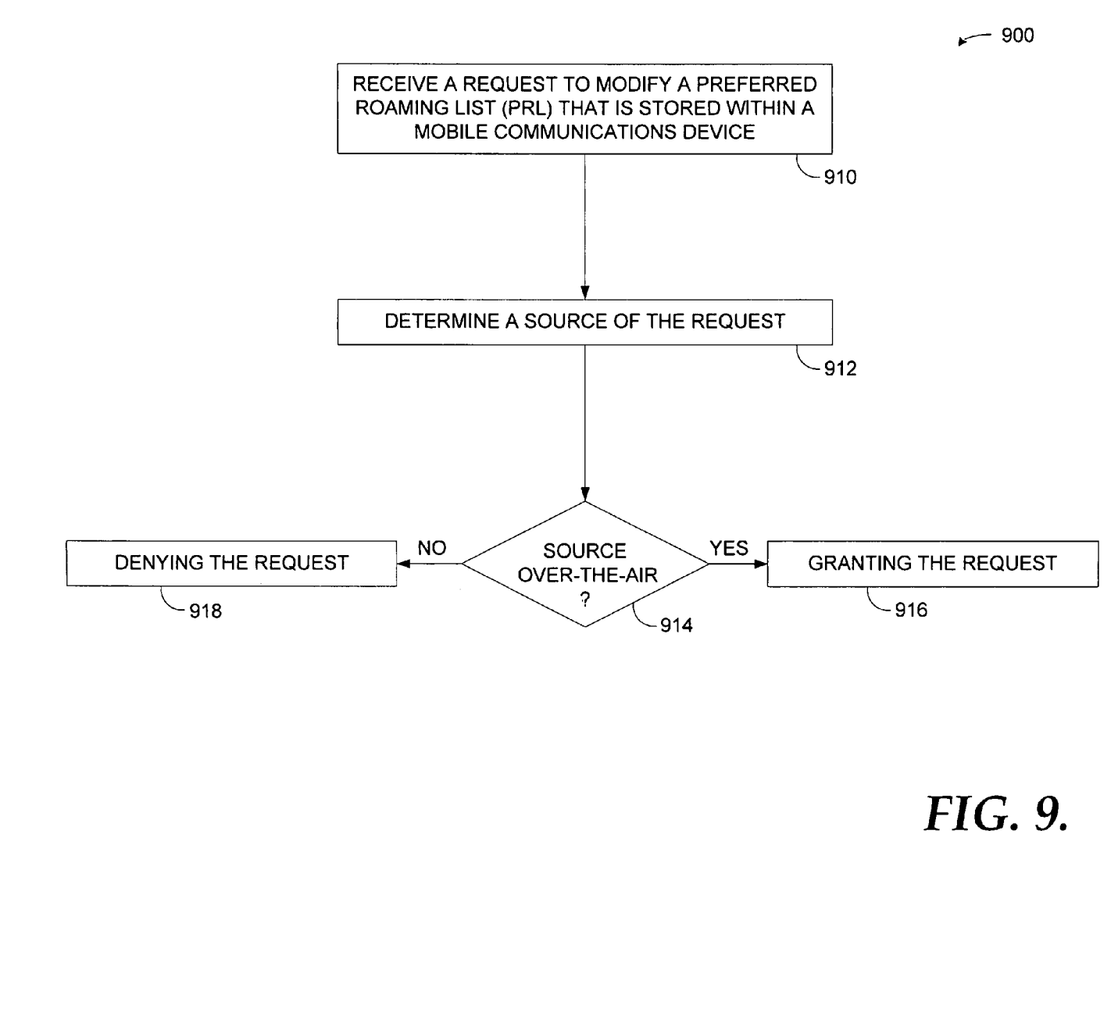

Turning now to FIG. 9, an illustrative method according to an embodiment of the present invention for protecting a preferred roaming list that is stored within a mobile communications device is provided and referenced generally by the numeral 900. At a step 910, a request to modify the PRL is received. At a step 912, determination is made as to a source of the request. We have previously described ways of determining a source of such a request. At a step 914, an evaluation is made as to whether the source was an over-the-air source. If so, then the request is granted at a step 916, but if not, then the request is denied at a step 918. Accordingly, the request is denied unless the source, and one embodiment, is a wireless telecommunications network that the mobile communications device is authorized to communicate with. Communication is usually accomplished by way of radio 226.

Figure 10:
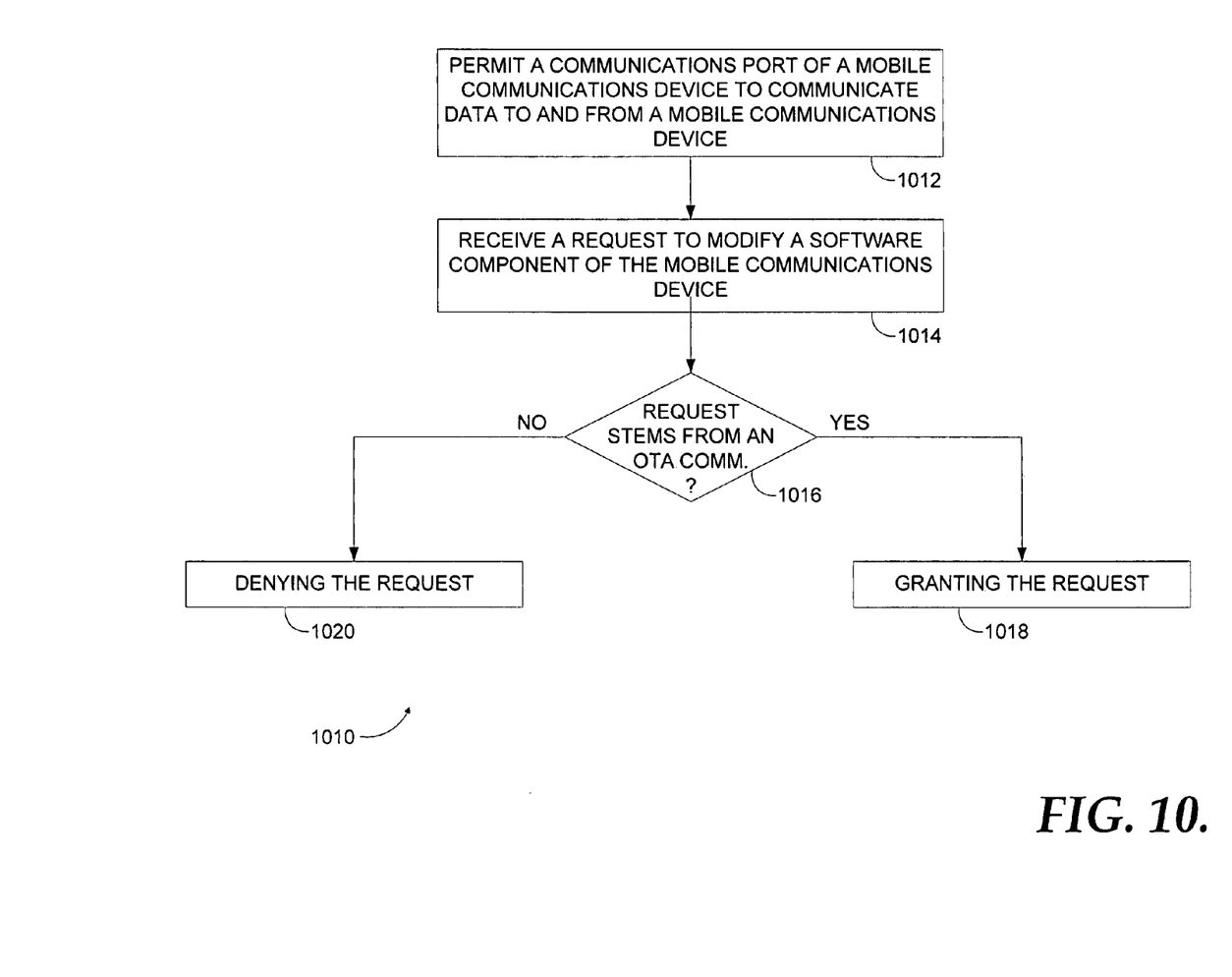

Turning to FIG. 10, a method of limiting access to certain software components that are stored within a mobile communications device is provided and referenced generally by the numeral 1010. At a step 1012, the communications port is allowed to communicate data to and from mobile communications device 200. At a step 1014, a request to modify a software component of the mobile communications device is received. Thus, whereas data might be allowed to be communicated to or from the mobile communications device, at a step 1014, a request to modify a software component of the mobile communication device is received. At a step 1016, a determination is made as to whether the request stems from an over-the-air communication.

This over-the-air communication would have stemmed from a wireless telecommunications network that the mobile communications device is authorized to communicate with. If the request did stem from such an over-the-air communication, then it is granted at a step 1018, but if not, it is denied at a step 1020. As mentioned, various methods for determining whether the request stemmed from an over-the-air communications exists including evaluating a pathway from which the request was received, evaluating an identifier associated with a module that received or is communicating the request, or even inspecting aspects of the request itself to determine whether it includes attributes that would be associated with receiving an over-the-air request.

If the request is granted, an additional aspect of the method could include modifying system-provider information 228 or even PRL 230. As mentioned, during a factory-programming state, or other original-programming state, modifying system-provider information 228 might be permitted. But after such original-programming, communicating data over the wire that is usable to modify system-provider information 228 is not allowed.

Some mobile communications devices have other forms of communicating data beyond communications ports. For example, Bluetooth® offers a way to communicate with a mobile communications device. But inasmuch as it is similar to communicating with the phone via a communications port, references made herein to prohibiting or limiting functionality of a communications port are also applicable to limiting a potential similar functionality that might be offered by way of another medium, such as Bluetooth® or even Wi-Fi. That is, everything that we have mentioned in the context of limiting communications into the device by way of a communications port, might also be applicable to limiting modification to software by using a Wi-Fi connection that can be established with the mobile communications device. As mentioned, some embodiments of the invention limit modification of system-provider information 228 to requests that are received over-the-air. Requests received via Bluetooth or Wi-Fi are not considered over-the-air unless they stemmed from a communication from wireless telecommunications network 432.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of selectively controlling the communications through a hard-wired communications port of a mobile communications device, wherein the mobile communications device stores system-provider information that is useable by the mobile communications device to communicate with a wireless telecommunications network that is designated in the system-provider information, the method comprising:
   presenting a user interface on the mobile communications device that exposes an option to enable the hard-wired communications port ("communications port") to be useable to modify the system-provider information, wherein the mobile communications device is in a first state that currently prohibits data from being passed through the communications port to the system-provider information, wherein the first state is characterized by an enabled subset of features of the communications port, and wherein the subset of features includes permitting the communications port to be used to retrieve data from the mobile communications device while preventing data from being communicated to the mobile communications device;
   receiving input to be used to enable data to be passed through the communications port to the system-provider information;
   authenticating the input to determine that it is a valid input that is authorized to transition the mobile communications device to a second state, in which the communications port is enabled to receive data that is useable to modify the system-provider information; and
   incident to authenticating the input, transitioning the mobile communications device to the second state.

2. The media of claim 1, wherein the system-provider information includes a list of frequencies on which the mobile communications device might search in order to communicate with the wireless telecommunications network.

3. The media of claim 1, wherein the system-provider information includes a list of systems that the device is permitted to access.

4. The media of claim 3, wherein the list of systems includes a list of wireless-telecommunications-systems providers ("providers").

5. The media of claim 1, wherein the system-provider information includes a preferred roaming list ("PRL").

6. The media of claim 1, wherein the subset of features includes permitting the communications port to be used to recharge a battery of the mobile communications device.

7. The media of claim 1, wherein the input includes a code.

8. The media of claim 7, wherein the code is a code that is capable of being entered by way of a keypad of the mobile communications device.

9. The media of claim 1, wherein the input is received incident to a determination that the mobile communications device is authorized to communicate with the wireless telecommunications network.

10. The media of claim 1, wherein the authenticating of the input is accomplished independently by the mobile communications device.

11. The media of claim 1, wherein the authenticating of the input is accomplished by a process that includes:
    passing the input to the wireless telecommunications network; and
    receiving a validity indication from the wireless telecommunications network.

12. The media of claim 1, further comprising modifying the system-provider information by receiving data through the communications port.

13. The media of claim 1, further comprising modifying any software within the mobile communications device by receiving data through the communications port.

14. A method of selectively controlling communications through a hard-wired communications port of a mobile communications device, wherein the mobile communications device stores system-provider information that is useable by the mobile communications device to communicate with a wireless telecommunications network that is designated in the system-provider information, the method comprising:
    disabling an ability of the hard-wired communications port ("communications port") to be useable to modify the system-provider information, wherein the communications port is enabled to recharge the mobile communications device while unable to pass data into the mobile communications device;
    storing a code in a memory component of the mobile communications device, which code is useable to enable the mobile communications device to receive via the communications port data that is useable to modify the system-provider information, such that
    (A) if the code is not entered into the mobile communications device, then passing data to the mobile communications device by way of the communications port is not allowed, but
    (B) if the code is entered into the mobile communications device, then passing data to the mobile communications device by way of the communications port is allowed.

15. The method of claim 14, wherein the system-provider information includes an indication of wireless-telecommunications-network providers which the mobile communications device is permitted to access.

16. A method of selectively controlling communications through a hard-wired communications port of a mobile communications device, wherein the mobile communications device stores system-provider information that is useable by the mobile communications device to communicate with one or more wireless telecommunications networks, the method comprising:

obtaining the mobile communication device in a state in which an ability of the hard-wired communications port ("communications port") to be used to input information into the mobile communications device is disabled, wherein the ability can be enabled by way of entering a code into the mobile communications device, which code, if correct, would allow data to be inputted to the mobile communications device by way of the communications port;

identifying the code, wherein identifying the code includes
        (A) establishing a communications link with a wireless telecommunications network that is designated in the system-provider information;
        (B) requesting the code from the wireless telecommunications network;
        (C) receiving the code from the wireless telecommunications network; and     entering the code into the mobile communications device, thereby enabling the communications port to be used to input data into the device.

17. The method of claim 16, further comprising modifying the system-provider information by passing data through the communications port.

\* \* \* \* \*